United States Patent
Juliato et al.

(10) Patent No.: US 11,966,503 B2
(45) Date of Patent: Apr. 23, 2024

(54) GLITCH ATTACK MITIGATION FOR IN-VEHICLE NETWORKS

(71) Applicant: Intel Corporation, Santa Clara, CA (US)

(72) Inventors: Marcio Juliato, Portland, OR (US); Vuk Lesi, Cornelius, OR (US); Christopher Gutierrez, Hillsboro, OR (US); Shabbir Ahmed, Beaverton, OR (US); Qian Wang, Portland, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 17/484,627

(22) Filed: Sep. 24, 2021

(65) Prior Publication Data
US 2022/0012371 A1    Jan. 13, 2022

(51) Int. Cl.
| | |
|---|---|
| *G06F 21/55* | (2013.01) |
| *G06F 21/51* | (2013.01) |
| *G06F 21/75* | (2013.01) |
| *G06F 21/81* | (2013.01) |
| *H04L 12/40* | (2006.01) |
| *H04L 9/40* | (2022.01) |

(52) U.S. Cl.
CPC ............ *G06F 21/755* (2017.08); *G06F 21/51* (2013.01); *G06F 21/554* (2013.01); *G06F 21/81* (2013.01); *H04L 12/40013* (2013.01); *H04L 2012/40215* (2013.01); *H04L 2012/40267* (2013.01); *H04L 2012/40273* (2013.01); *H04L 63/1416* (2013.01)

(58) Field of Classification Search
CPC ...... G06F 21/755; G06F 21/51; G06F 21/554; G06F 21/81; G06F 2221/2135; G06F 21/52
See application file for complete search history.

(56) References Cited

U.S. PATENT DOCUMENTS

| | | | | |
|---|---|---|---|---|
| 5,774,736 | A * | 6/1998 | Wright ................ | G06F 11/2015 714/22 |
| 10,474,846 | B1 * | 11/2019 | Rezayee ................. | G07F 9/026 |
| 2018/0268174 | A1 * | 9/2018 | Bathurst ................. | H04W 4/48 |
| 2018/0270195 | A1 * | 9/2018 | Bathurst ............ | H04L 63/0209 |
| 2018/0270196 | A1 * | 9/2018 | Bathurst ........... | H04L 12/40032 |

(Continued)

FOREIGN PATENT DOCUMENTS

WO    WO-2018013171 A1 *    1/2018    ............. H04L 12/40

OTHER PUBLICATIONS

R. Velegalati, K. Shah and J.-P. Kaps, "Glitch Detection in Hardware Implementations on FPGAs Using Delay Based Sampling Techniques," 2013 Euromicro Conference on Digital System Design, Los Alamitos, CA, USA, 2013, pp. 947-954 (Year: 2013).*

(Continued)

*Primary Examiner* — Farid Homayounmehr
*Assistant Examiner* — Zhimei Zhu
(74) *Attorney, Agent, or Firm* — KDW Firm PLLC

(57) ABSTRACT

Systems, apparatuses, and methods to mitigate effects of glitch attacks on a broadcast communication bus are provided. The voltage levels of the communication bus are repeatedly sampled to identify glitch attacks. The voltage level on the communication bus can be overdriven or overwritten to either corrupt received messages or correct received messages.

22 Claims, 11 Drawing Sheets

(56) References Cited

U.S. PATENT DOCUMENTS

| | | | | |
|---|---|---|---|---|
| 2019/0332823 | A1* | 10/2019 | Kwon | G06F 21/554 |
| 2020/0204395 | A1* | 6/2020 | Takahashi | H04L 12/40117 |
| 2020/0351168 | A1* | 11/2020 | Hirano | H04L 67/131 |
| 2021/0004461 | A1* | 1/2021 | Guilley | H01L 23/576 |
| 2021/0044415 | A1 | 2/2021 | Vowe et al. | |
| 2022/0100853 | A1* | 3/2022 | Gehrer | G06F 21/755 |
| 2022/0407880 | A1* | 12/2022 | Rosadini | H04L 12/12 |
| 2023/0049371 | A1* | 2/2023 | Sharma | G01R 22/066 |
| 2023/0090242 | A1* | 3/2023 | Duplys | H04L 41/0233 |
| | | | | 709/224 |

OTHER PUBLICATIONS

Loic Zussa, Jean-Max Dutertre, Jessy Clediere, Bruno Robisson. Analysis of the fault injection mechanism related to negative and positive power supply glitches using an on-chip voltmeter. IEEE Int. Symposium on Hardware-Oriented Security and Trust (HOST), May 2014, Arlington, France (Year: 2014).*

Colin O'Flynn, "A Framework for Embedded Hardware Security Analysis", 2017, PhD thesis, obtained online from <https://dalspace.library.dal.ca/bitstream/handle/10222/73002/OFlynn-Colin-PhD-ECED-June-2017.pdf?sequence=1&isAllowed=y>, retrieved on Jul. 28, 2023 (Year: 2017).*

A. Milburn et al. "There Will Be Glitches: Extracting and Analyzing Automotive Firmware Efficiently" Black Hat USA, obtained online from <https://i.blackhat.com/us-18/Wed-August-8/us-18-Milburn-There-Will-Be-Glitches-Extracting-And-Analyzing-Automotive-Firmware-Efficiently.pdf>, retrieved on Jul. 29, 2023 (Year: 2018).*

Scott Best, "Understanding Anti-Tamper Technology: Part 1", Jul. 22, 2020, obtained online from <https://www.rambus.com/blogs/understanding-anti-tamper-technology-part-1/>, retrieved on Jul. 28, 2023 (Year: 2020).*

Jeremy Boone, "There's a Hole in Your SoC: Glitching the MediaTek BootROM", Oct. 15, 2020, obtained online from <https://research.nccgroup.com/2020/10/15/theres-a-hole-in-your-soc-glitching-the-mediatek-bootrom/>, retrieved on Jul. 28, 2023 (Year: 2020 ).*

European Search Report dated Dec. 7, 2022, for Application No. 22181509.5 (seven (7) pages).

Bittner et al., "The Forgotten Threat of Voltage Glitching: A Case Study on Nvidia Tegra X2 SoCs", 2021 Workshop on Fault Detection and Tolerance in Cryptography (FDTC), IEEE, Sep. 17, 2021, pp. 86-97.

* cited by examiner

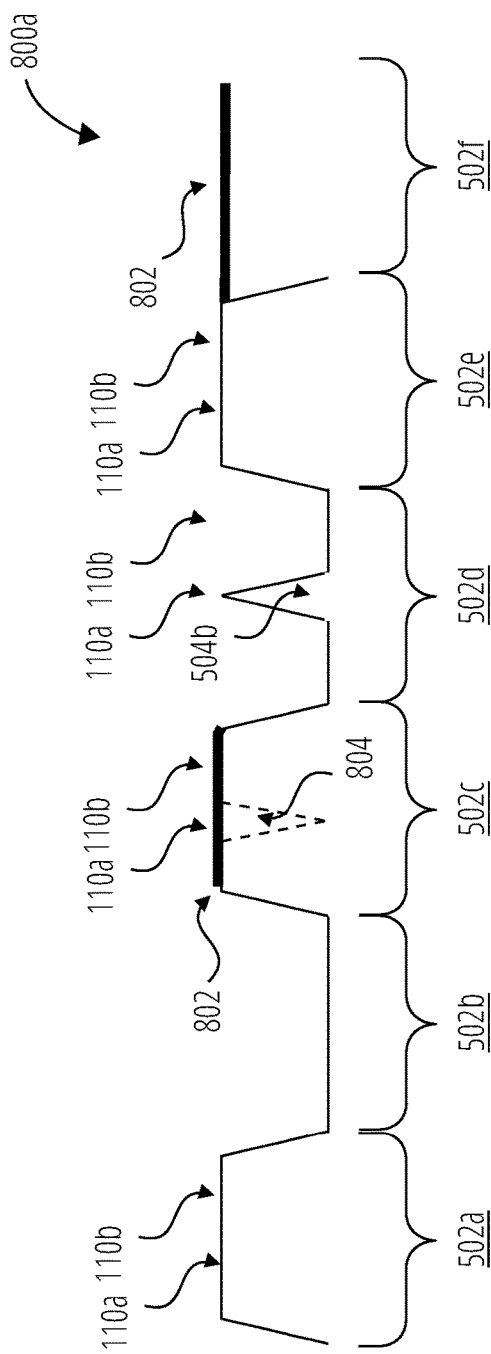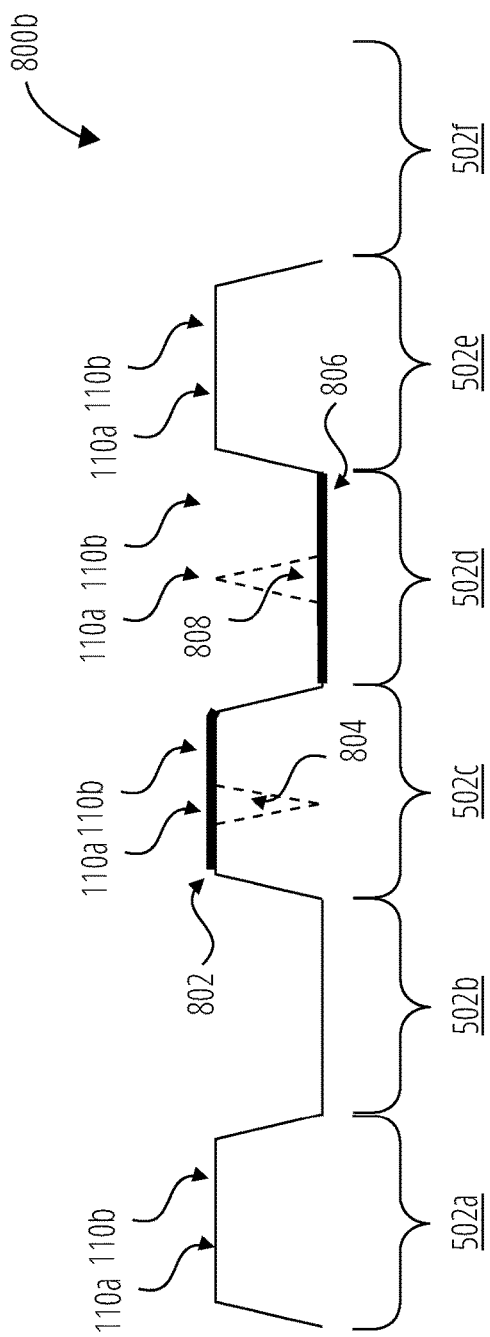

GLITCH ATTACK MITIGATION FOR IN-VEHICLE NETWORKS

BACKGROUND

Modern automobiles include a number of sensors, controllers, and processors. These devices often communicate signals and/or messages via a common bus. For example, an in-vehicle network (IVN) can be used to send messages between devices in a vehicle. Attacks against such IVNs can have severe safety consequences and often must be mitigated in real time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8A illustrates a voltage waveform in accordance with at least one embodiment.

FIG. 8B illustrates a voltage waveform in accordance with at least one embodiment.

DETAILED DESCRIPTION

Various embodiments of the present disclosure are directed to providing mitigation against "glitch" style attacks on a communication network, such as, an IVN. As used herein, a glitch style attack is any attempt to mislead a node on the network based on exploiting different sampling times of the network nodes. For example, a malicious actor (e.g., malicious electronic control unit (ECU), or the like) can transmit a message where voltage levels are "glitched" such that different nodes sample different voltage levels for the same bit. Messages received at the receiving nodes are all valid but can differ from each other due to the different sampled voltage levels. Compounding this problem is the fact the receivers cannot distinguish fake information from authentic information. As a result, the receiving nodes may make different decisions and/or take different action based on the received message.

The present disclosure provides systems and methods that can be implemented to mitigate attempts to mislead receiving nodes based on exploiting sampling time of receiving nodes. In particular, the present disclosure provides systems and methods arranged to monitor the communication bus and force bit levels to remain constant through the entire bit width to prevent or mitigate against glitch style attacks. A centralized approach as well a distributed approach are described. It is noted that although the present disclosure often references vehicles, vehicle ECUs, and IVNs in describing illustrative examples, the claims can be applied to a variety of broadcast communication networks where sampling mechanisms would be susceptible to glitch style attacks. For example, broadcast communication networks are found in industrial, commercial, retail, transportation, aircraft, military, etc., systems and the present disclosure is applicable to all such systems.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1:
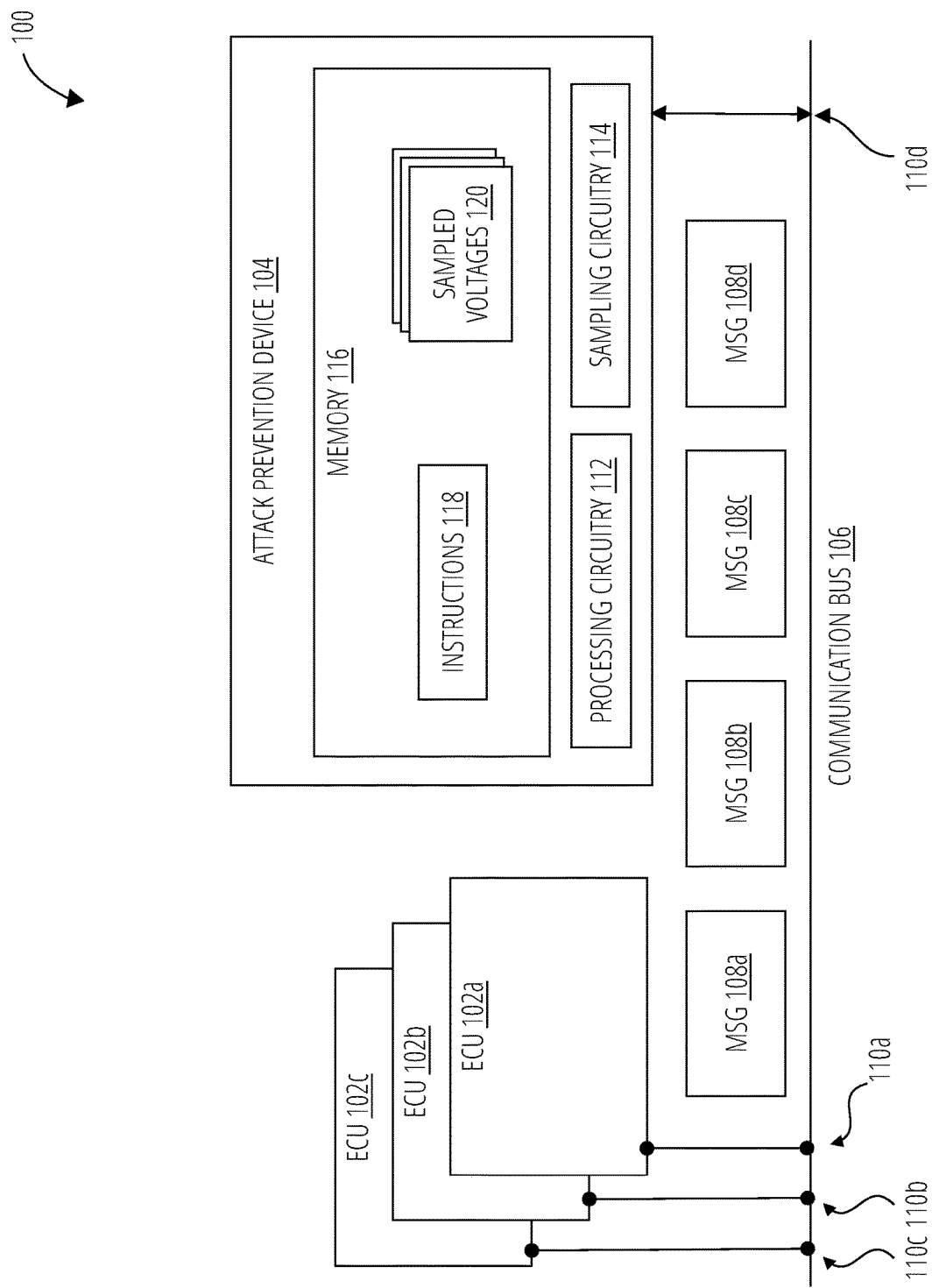
FIG. 1 illustrates a system in accordance with at least one embodiment.

FIG. 1 illustrates an example system 100, which can be implemented in a vehicle, such as, for example, an automobile, a motorcycle, an airplane, a boat, a personal watercraft, an all-terrain vehicle, or the like. System 100 includes a number of electronic control units (ECUs), for example, ECU 102a, ECU 102b, and ECU 102c are depicted. System 100 further includes attack prevention device 104. System 100 includes a communication bus 106, which can be a CAN bus, a FlexRay bus, a CAN FD bus, an inter-integrated circuit (I2C) bus, a serial peripheral interface (SPI) bus, an automotive ethernet bus, or a local interconnected network (LIN) bus, or an interconnect or bus for memory or other circuitry (intellectual property (IP) cores, or the like). Additionally, where implemented in contexts outside of the automotive space, the communication bus 106 can be a network bus adapted to the particular implementation, such as, for example, a communication network for manufacturing equipment, or the like.

In general, each of ECU 102a, ECU 102b, and ECU 102c include circuitry arranged to generate messages and transmit the messages onto communication bus 106 and/or consume messages from communication bus 106. The depicted ECUs (e.g., ECU 102a, ECU 102b, and ECU 102c) can be any of a variety of devices, such as, for example, sensor devices, actuator devices, microprocessor control devices, memory, IP cores, or the like. For example, the ECUs include circuitry arranged to manipulate voltage levels on communication bus 106 (e.g., see FIG. 3) to communicate messages via the communication bus 106. As depicted, system 100 includes ECU 102a, ECU 102b, and ECU 102c. This is done for clarity of presentation. However, in practice (e.g., in a modern automobile, or the like) hundreds of ECUs may be provided in system 100, such as, ECUs for engine control, transmission, airbags, antilock braking, cruise control, electric power steering, audio systems, power windows, power doors, power mirror adjustment, battery, recharging systems for hybrid/electric cars, environmental control systems, entertainment, auto start stop systems, blind spot monitoring, lane keeping assist systems, collision avoidance systems, and more complex systems in the case of autonomous, or semi-autonomous vehicles.

ECUs are arranged to generate and/or consume messages, where the messages can include data or commands. Specifically, ECUs can convey messages via communication bus 106. In particular, this figure depicts a number of messages (MSGs), such as, message 108*a*, message 108*b*, message 108*c*, and message 108*d*. The number of messages is depicted for purposes of clarity and ease of explanation. Additionally, each of ECUs 102*a*, 102*b*, and 102*c* are coupled to communication bus 106 at different connection points. For example, ECU 102*a* couples to communication bus 106 at connection point 110*a*, ECU 102*b* couples to communication bus 106 at connection point 110*b*, and ECU 102*c* couples to communication bus 106 at connection point 110*a*. During operation, one of ECUs 102*a*, 102*b*, or 102*c* may be malicious. For example, ECU 102*c* may transmit a malicious message with a glitch such that the other ECUs (e.g., ECU 102*a* and ECU 102*b*) receive different bits due to their sampling the voltage levels of the communication bus 106 at different points in time.

Attack prevention device 104 is arranged to mitigate such attacks. To this end, attack prevention device 104 couples to bus at connection point 110*d* and includes processing circuitry 112, sampling circuitry 114, and memory 116. Memory 116 includes instructions 118 (e.g., firmware, or the like) that can be executed by processing circuitry 112 and/or sampling circuitry 114. During operation, sampling circuitry 114 can sample voltage levels on communication bus 106 at connection point 110*d* at multiple points in time, resulting in sampled voltages 120. Further, processing circuitry 112 can execute instructions 118 to identify a glitch style attack based on sampled voltages 120 and processing circuitry 112 and/or sampling circuitry 114 can execute instructions 118 to apply mitigation actions (e.g., adjust the voltage levels on communication bus 106, or the like) to either correct the received messages or to corrupt the received messages. This is described in greater detail below.

Processing circuitry 112 can include any of a variety of processors, such as, for example, commercial central processing units, application specific integrated circuits, or the like. Processing circuitry 112 can be a microprocessor or a commercial processor and can include one or multiple processing core(s) and can also include cache. Sampling circuitry 114 can include circuitry such as, analog to digital converters, voltage measurement circuitry, voltage waveform observation circuitry (e.g., oscilloscope circuitry, or the like) arranged to sample voltage levels on communication bus 106 and to control or drive voltage levels on communication bus 106.

Memory 116 can be based on any of a wide variety of information storage technologies. For example, memory 116 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 116 can include storage devices.

Figure 2:
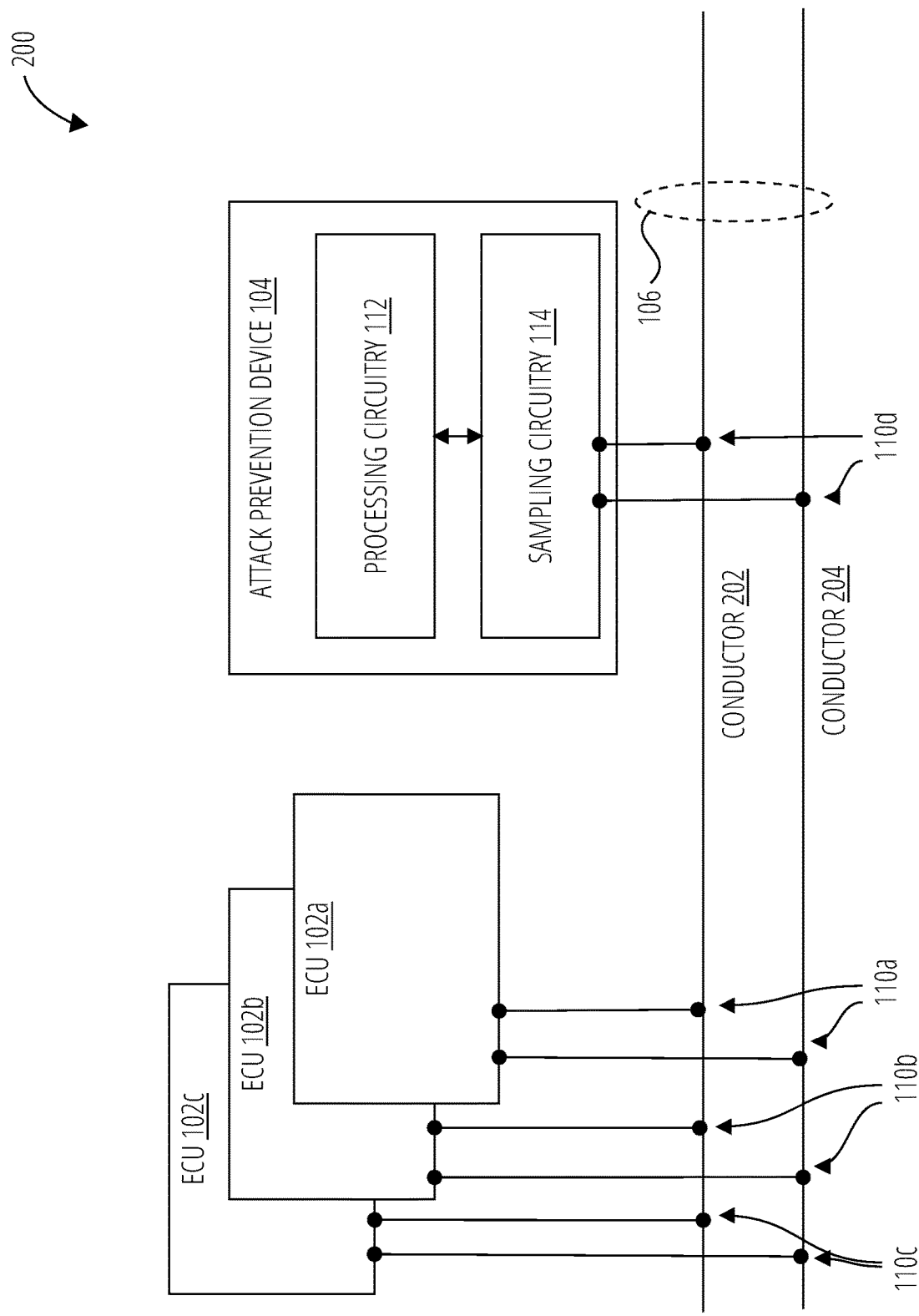
FIG. 2 illustrates a centralized system in accordance with at least one embodiment.

FIG. 2 illustrates system 200, which is a portion of system 100 of FIG. 1 in more detail. In particular, system 200 can correspond to a centralized attack mitigation system. That is, attack prevention device 104 and particularly sampling circuitry 114 can be coupled anywhere on 106 relative to the other nodes (e.g., ECUs 102*a*, 102*b*, and 102*c*). Further, as depicted, communication bus 106 can comprise a pair of conductors, such as conductor 202 and conductor 204. During operation, ECUs (e.g., ECU 102*a*, ECU 102*b*, ECU 102*c*, or the like) can communicate signals via conductor 202 and conductor 204 (e.g., at sampling points 110*a*, 110*b*, and 110*a*) while sampling circuitry 114 can observe and/or control analog voltages on conductor 202 and conductor 204 (e.g., at connection point 110*d*). It is noted that although a two-conductor bus is depicted herein, the present disclosure is applicable to multiple different bus structures, such as, those with a single conductor or more than two conductors.

Figure 3:
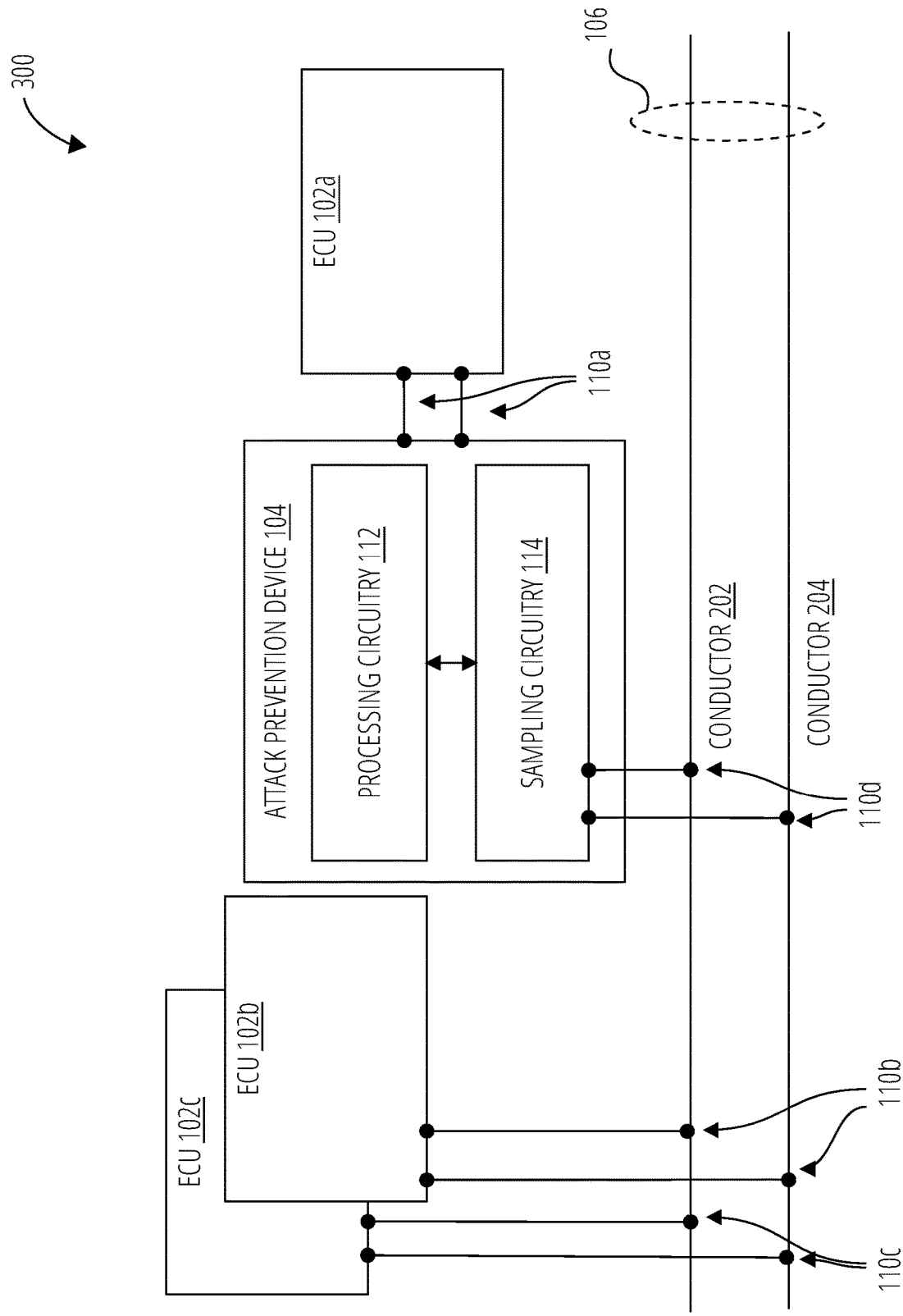
FIG. 3 illustrates a distributed system in accordance with at least one embodiment.

FIG. 3 illustrates system 300, which can be a portion of system 100 of FIG. 1 in more detail. In particular, system 300 can correspond to a distributed attack mitigation system. That is, attack prevention device 104 and particularly sampling circuitry 114 is coupled between a protected node (e.g., ECU 102*a*) and the communication bus 106. Systems 200 and 300 are described in greater detail below. However, prior to that example voltage waveforms and glitches are described.

Figure 4:
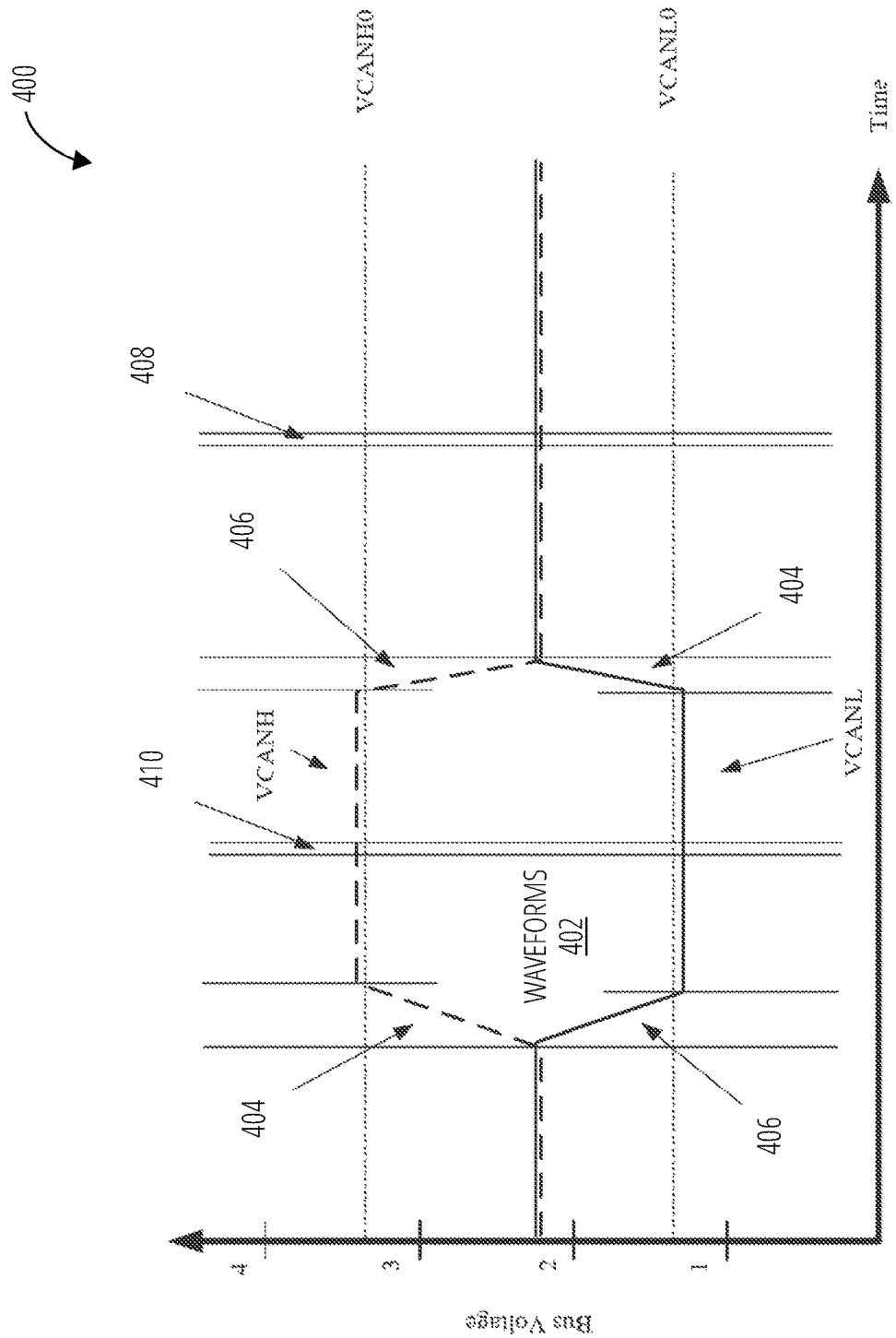
FIG. 4 illustrates a graph in accordance with at least one embodiment.

As a specific example, communication bus 106 can be an IVN comprising a CANH conductor (e.g., conductor 202) and a CANL conductor (e.g., conductor 204). Accordingly, FIG. 4 illustrates graph 400, showing example waveforms 402 undergoing voltage transitions. Although the present disclosure can be implemented for IVNs (e.g., the CAN bus, or the like) and the waveforms 402 are described with reference to the CAN bus, examples are not limited in this regard. FIG. 4 depicts nominal recessive and dominant bus voltages for a CAN bus. The CAN bus is comprised of two conductors, as such two waveforms 402 are depicted.

When an ECU (e.g., ECU 102*a*, ECU 102*b*, ECU 102*c*, or the like) sends a 0 bit, it does so by increasing a first voltage (VCANH coupled to CANH) to at least VCANH0 and decreasing a second voltage (VCANL coupled to CANL) to at least VCANL0. For example, VCANH0 may be about 3.5 volts (V), while the VCANL0 may be about 1.5V. It is noted that the term "about" may mean within a threshold value (e.g., as specified by the CAN standard, such as, CAN Specification version 2.0 promulgated by Bosch GmbH) and can be dependent upon the bus standard, which may dictate the tolerance. In the recessive state, either the CAN bus (e.g., communication bus 110) is idle or an ECU is transmitting a logic 1. In the dominant state, at least one ECU is transmitting a logic 0. Thus, each waveform on the CAN bus can go through a number of voltage transitions.

These voltage transitions are measured as a voltage over time and correspond to a portion of the overall voltage waveform. In particular, waveforms 402 can have a rising edge transition 404 or a falling edge transition 406. Additionally, waveforms 402 can have a steady state transition 408 and a steady state transition 410. That is, waveforms 402 can have a steady state transition 410 for both the recessive state as well as a steady state transition 408 for the dominant state. To send a message (e.g., message 130, message 132, message 134, message 136, or the like) on the CAN bus, an ECU must cause a number of voltage transitions (e.g., rising edge transition 404, falling edge transition 406, steady state transition 408, and/or steady state transition 410) on the CAN bus to communicate bits indicating the contents of the message. Accordingly, during operation, analog voltage waveforms corresponding to messages (e.g., messages 108a 108b, 108c, etc.) can be observed on conductor(s) of communication bus 106.

Although the present disclosure (e.g., FIG. 4 and FIG. 5, etc.) reference a CAN bus with dominant and recessive voltage levels, the present disclosure can be applied to other types of busses, for example, pull-up and/or pull-down busses, on-chip busses, etc. Examples are not limited in this context.

Figure 5:
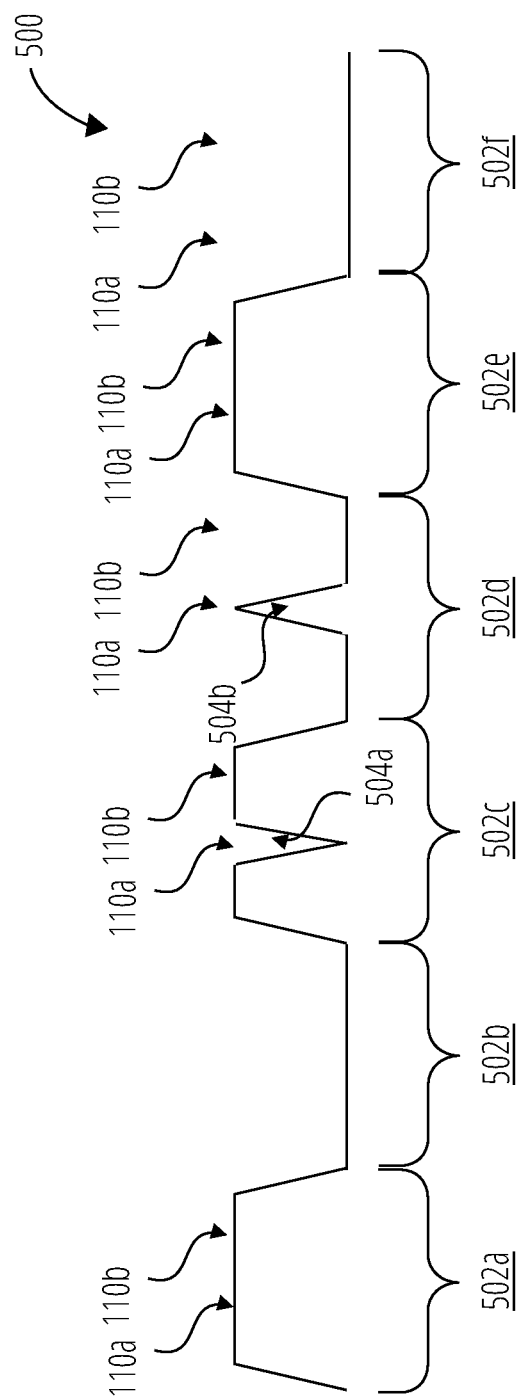
FIG. 5 illustrates a voltage waveform.

FIG. 5 illustrates a voltage waveform 500, associated with a glitch style attack, in accordance with non-limiting example(s) of the present disclosure. Voltage waveform 500 can be transmitted over a number of time periods 502a, 502b, 502c, 502d, 502e, and 502f and sampled by receiving ECUs (e.g., ECU 102a and ECU 102b) during each of time periods 502a, 502b, 502c, 502d, 502e, and 502f at respective connection points 110a and 110b. It is noted that voltage waveform 500 can correspond to voltage waveforms transmitted on a bus (e.g., CANH conductor of a bus, CANL conductor of a bus, or the like) and as such, may not necessarily correspond to a particular binary value. However, for ease of description, the high voltage level (e.g., the dominant CANH voltage) may be referred to as logic 0 while the lower voltage level (e.g., the recessive CANH voltage) may be referred to as logic 1, without limiting the claims. It is to be appreciated that alternative voltage levels and corresponding digital representations may be practiced. Voltage waveform 500 further depicts glitches during time periods 502c and 502d. For example, glitch 504a depicts a recessive glitch where a malicious ECU (e.g., ECU 102c, or the like) allows the voltage level of the bus (e.g., communication bus 106) to drop from the dominant level to the recessive level during the glitch 504a. Similarly, glitch 504b depicts a dominant glitch where a malicious ECU (e.g., ECU 102c, or the like) drives the voltage level of the bus (e.g., communication bus 106) from the recessive level to dominant level during the glitch 504b.

ECUs 102a and 102b sampling voltage waveform at connection points 110a and 110b would receive a series of bits that each appear correct from the perspective of the receiving ECUs 102a and 102b, but which are in fact different from each other. For example, ECU 102a would receive bit series [0, 1, 1, 0, 0, 1] while ECU 102b would receive bit series [0, 1, 0, 1, 0, 1]. As such, receiving ECUs 102a and 102b would receive different messages based on voltage waveform 500.

Figure 6:
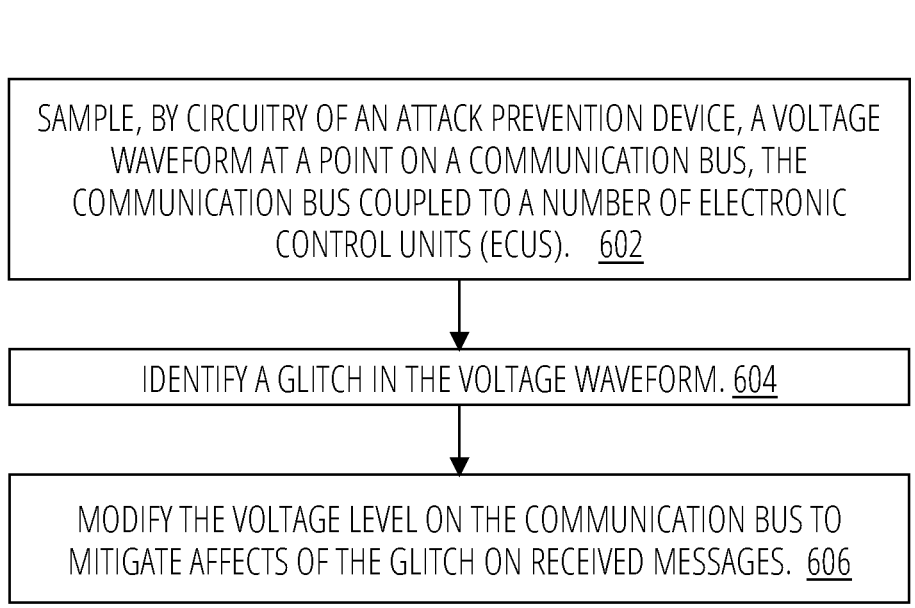
FIG. 6 illustrates a method of identifying glitches in accordance with at least one embodiment.

FIG. 6 illustrates a method 600 for mitigating a glitch style attack, in accordance with non-limiting example(s) of the present disclosure. Method 600 can be implemented by an attack prevention device, such as, attack prevention device 104 of system 100. In particular, method 600 can be implemented by attack prevention device 104 to mitigate glitch attacks perpetrated by one of ECUs 102a, 102b, or 102c against the other ECUs. It is noted that methods (or logic flows) described herein, including method 600 and other methods described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Method 600 can begin at block 602. At block 602 "sample, by circuitry of an attack prevention device, a voltage waveform at a point on a communication bus, the communication bus coupled to a number of electronic control units (ECUs)" a voltage waveform can be sampled at point on a communication bus where the communication bus is coupled to a number of ECUs. For example, attack prevention device 104 can sample voltage levels on communication bus 106 at connection point 110d. In particular, processing circuitry 112 and/or sampling circuitry 114 can execute instructions 118 to sample voltage levels on communication bus 106 at connection point 110d. With some implementations, attack prevention device 104 repeatedly (e.g., on a fixed period, or the like) samples voltage levels on communication bus 106 at connection point 110d to generate sampled voltages 120.

Continuing to block 604 "identify a glitch in the voltage waveform" a glitch in the voltage waveform can be identified. For example, attack prevention device 104 can detect a glitch in the voltage waveform transmitted on communication bus 106 based on sampled voltages 120. For example, processing circuitry 112 and/or sampling circuitry 114 can execute instructions 118 to identify a glitch (e.g., glitch 504a, glitch 504b, etc.) based on sampled voltages 120.

Continuing to method 606 "modify the voltage level on the communication bus to mitigate effects of the glitch on received messages" the voltage level on the bus can be modified to mitigate effects of the glitch identified at block 604. For example, attack prevention device 104 can modify the voltage level on communication bus 106 to mitigate effects from the identified glitch (see FIG. 8A). That is, processing circuitry 112 and/or sampling circuitry 114 can execute instructions 118 to modify voltage levels on communication bus 106 to mitigate the effects from the glitch identified based on 120. As a specific example, processing circuitry 112 and/or sampling circuitry 114 can execute instructions 118 to drive detected recessive bits on the communication bus 106 to the dominant voltage level to corrupt any received messages based on an identified glitch (e.g., an identified recessive glitch, or the like). As another example, processing circuitry 112 and/or sampling circuitry 114 can execute instructions 118 to execute method 700 at method 606.

Figure 7:
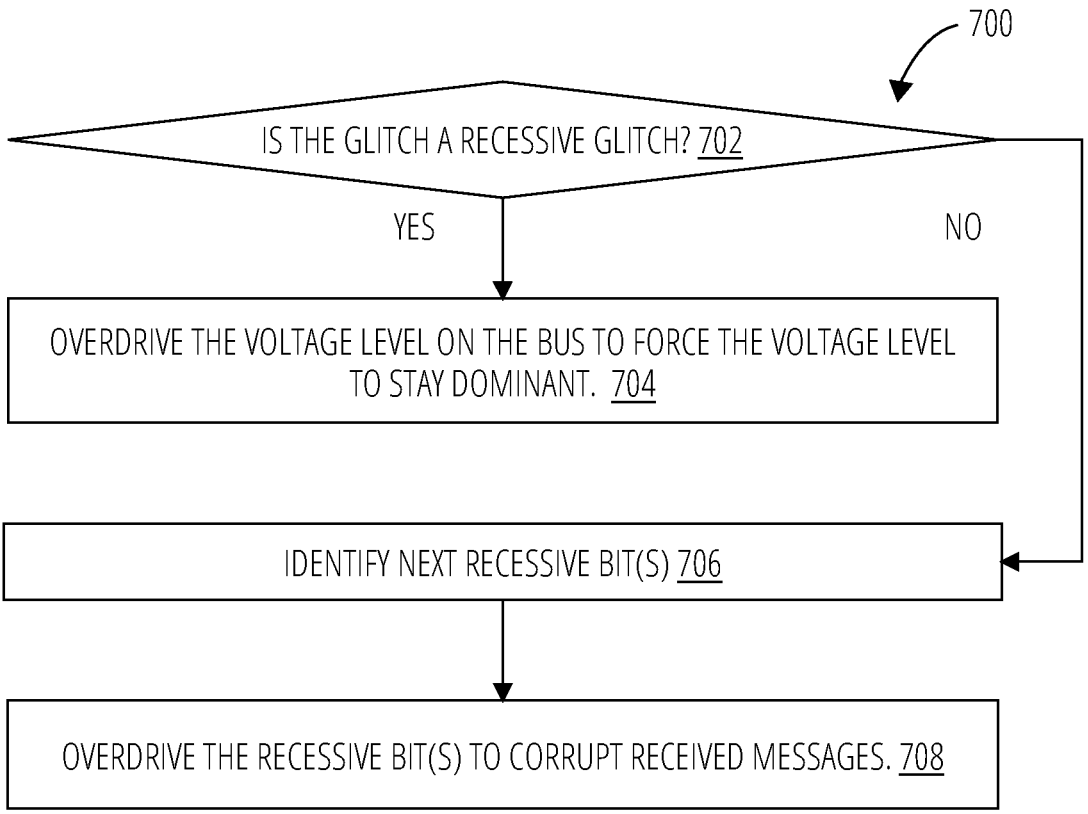
FIG. 7 illustrates a method of mitigating glitches in accordance with at least one embodiment.

FIG. 7 illustrates a method 700 for adjusting voltage levels on a bus to mitigate effects of an identified glitch attack, in accordance with non-limiting example(s) of the present disclosure. Method 700 can be implemented by attack prevention device 104 operating in a centralized manner, such as, for example, system 200 of FIG. 2. Method 700 can begin at decision block 702. At decision block 702 "is the glitch a recessive glitch?" a determination whether the glitch is a recessive glitch is made. For example, attack prevention device 104 can determine whether the glitch (e.g., identified at block 604 of method 600, or the like) is a recessive glitch (e.g., like glitch 504a) or not. From decision block 702, method 700 can continue to either block 704 or block 706. For example, method 700 can continue from decision block 702 to block 704 based on a determination that the glitch is a recessive glitch while method 700 can continue from decision block 702 to block 706 based on a determination that the glitch is not a recessive glitch.

At block 704 "overdrive the voltage level on the bus to force the voltage level to stay dominant" the voltage level on the bus can be overdriven to stay at the dominant level. For example, attack prevention device 104 can overdrive the malicious ECU to force the voltage level on communication bus 106 to stay dominant for the entire duration of time periods. In particular, processing circuitry 112 and/or sampling circuitry 114 can execute instructions 118 to drive voltage levels on communication bus 106 to the dominant level to overdrive the glitch 504a by the malicious ECU. For example, FIG. 8A depicts voltage waveform 800a, which is like voltage waveform 500 except that the voltage level is overdriven during time period 502c to correct glitch 504a, resulting in voltage level overdrive 802 and corrected dominant glitch 804.

At block 706 "identify the next recessive bit(s)" the next number of recessive bits can be identified. For example, attack prevention device 104 can identify the next recessive bit transmitted on communication bus 106, the next two (2) recessive bits transmitted on communication bus 106, the next three (3) recessive bits transmitted on communication bus 106, or the like. In particular, processing circuitry 112 and/or sampling circuitry 114 can execute instructions 118 to cause processing circuitry 112 and/or sampling circuitry 114 to sample voltage levels on communication bus 106 to identify the next number of recessive bits on communication bus 106.

Continuing to block 708 "overdrive the recessive bit(s) to corrupt the received messages" the number of identified recessive bits can be overdriven to corrupt any received messages. For example, attack prevention device 104 can overdrive the identified recessive bits to force the voltage level to be dominant during the time in which the recessive bit(s) are transmitted on communication bus 106, which will corrupt any received messages. In particular, processing circuitry 112 and/or sampling circuitry 114 can overdrive the voltage levels on communication bus 106 during the time in which the recessive bits are identified to corrupt messages received based on the recessive bits and the identified glitch 504b. For example, FIG. 8A depicts voltage waveform 800a, which is like voltage waveform 500 except that the voltage level of the recessive bit after glitch 504b (e.g., time period 502f) is overdriven (e.g., voltage level overdrive 802) resulting in corruption of the received messages.

Figure 9:
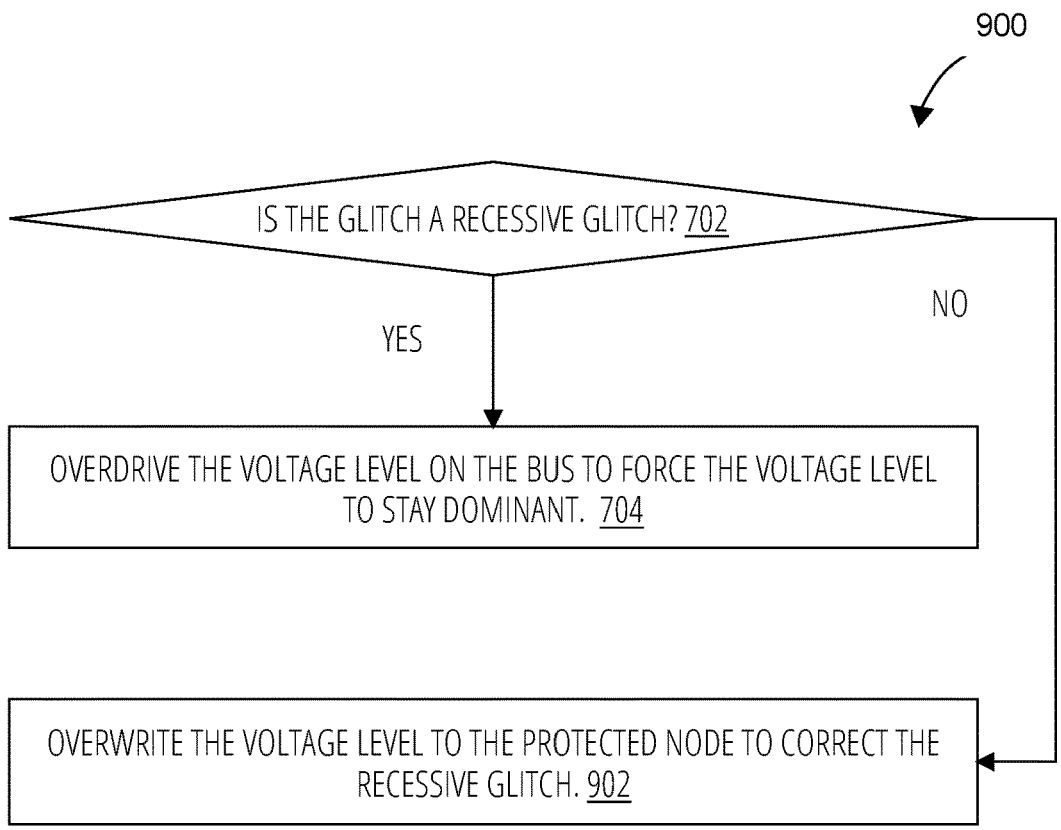
FIG. 9 illustrates a method of mitigating glitches in accordance with at least one embodiment.

FIG. 9 illustrates a method 900 for adjusting voltage levels on a bus to mitigate effects of an identified glitch attack, in accordance with non-limiting example(s) of the present disclosure. Method 900 can be implemented by attack prevention device 104 operating in a distributed manner, such as, for example, system 300 of FIG. 3. Method 900 can begin like method 700, with decision block 702. From decision block 702, method 900 can continue to either block 704 or block 902. For example, method 900 can continue from decision block 702 to block 704 based on a determination that the glitch is a recessive glitch while method 900 can continue from decision block 702 to block 902 based on a determination that the glitch is not a recessive glitch.

Block 704 of method 900 can be like block 704 of method 700, where the voltage level on the bus can be overdriven to stay at the dominant level. For example, attack prevention device 104 can overdrive the malicious ECU to force the voltage level on communication bus 106 to stay dominant for the entire duration of time periods. In particular, processing circuitry 112 and/or sampling circuitry 114 can execute instructions 118 to drive voltage levels on communication bus 106 to the dominant level to overdrive the glitch 504a by the malicious ECU.

At block 902 "overwrite the voltage level to the protected node to correct the recessive glitch" the voltage level to the protected node can be overwritten to correct the recessive glitch. For example, attack prevention device 104 can overwrite the voltage level on communication bus 106 such the voltage level received by the protected node (e.g., ECU 102a) is recessive. This is depicted in FIG. 8B, which illustrates voltage waveform 800b. In particular, at block 712 processing circuitry 112 and/or sampling circuitry 114 can execute instructions 118 to cause voltage level overwrite 806 in time period 502d to such that glitch 504b is corrected dominant glitch 808 and ECU 102a receives a recessive voltage level in time period 502d as intended. It is noted that at block 712, the voltage level on the communication bus 106 is not overwritten and as such, other ECUs (e.g., ECU 102b and/or ECU 102c) besides the protected ECU (e.g., ECU 102a) may sample the voltage level at the glitch 504b.

It is important to note that voltage level overdrive 802 may be applied after an initial stabilization period of each time period (e.g., time period 502a, etc.). For example, attack prevention device 104 can repeatedly sample voltage levels on communication bus 106 during each time period and after the voltage level has stabilized identify glitches and adjust voltage levels as outlined herein.

Figure 10:
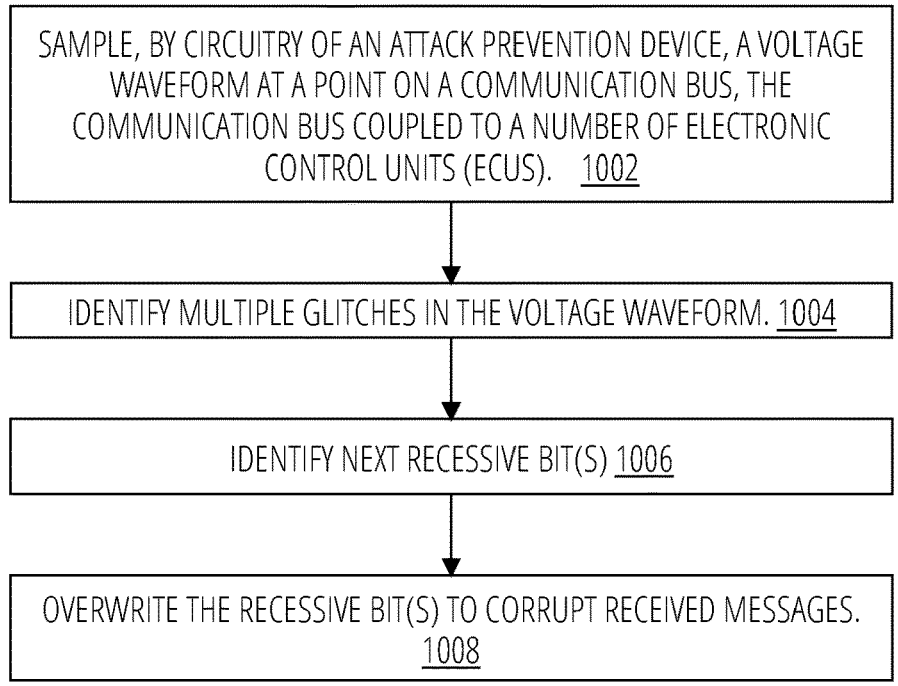
FIG. 10 illustrates a method of mitigating attacks against the described glitch mitigations defenses in accordance with at least one embodiment.

FIG. 10 illustrates a method 1000 for mitigating an attack against a glitch style attack mitigation defense such as proposed in the present disclosure, in accordance with non-limiting example(s) of the present disclosure. Method 1000 can be implemented by an attack prevention device, such as, attack prevention device 104 of system 100. In particular, method 1000 can be implemented by attack prevention device 104 to defend against attacks on a glitch attack mitigation defense perpetrated by one of ECUs 102a, 102b, or 102c against the attack prevention device 104 of system 100.

Method 1000 can begin at block 1002. At block 1002 "sample, by circuitry of an attack prevention device, a voltage waveform at a point on a communication bus, the communication bus coupled to a number of electronic control units (ECUs)" a voltage waveform can be sampled at point on a communication bus where the communication bus is coupled to a number of ECUs. For example, attack prevention device 104 can sample voltage levels on communication bus 106 at connection point 110d. In particular, processing circuitry 112 and/or sampling circuitry 114 can execute instructions 118 to sample voltage levels on communication bus 106 at connection point 110d. With some implementations, attack prevention device 104 repeatedly (e.g., on a fixed period, or the like) samples voltage levels on communication bus 106 at connection point 110d to generate sampled voltages 120.

Continuing to block 1004 "identify multiple glitches in the voltage waveform" a number of glitches in the voltage waveform can be identified. For example, attack prevention device 104 can detect multiple glitches in the voltage waveform transmitted on communication bus 106 based on sampled voltages 120. Said differently, attack prevention device 104 can detect instability in the stable region of the voltage waveform, indicative of multiple repeated glitches. For example, processing circuitry 112 and/or sampling circuitry 114 can execute instructions 118 to identify multiple glitches (e.g., like glitch 504a, like glitch 504b, etc.) in a single time period, within a threshold distance from each other, or the like.

Continuing to block 1006 "identify the next recessive bit(s)" the next number of recessive bits can be identified. For example, attack prevention device 104 can identify the next recessive bit transmitted on communication bus 106, the next two (2) recessive bits transmitted on communication bus 106, the next three (3) recessive bits transmitted on communication bus 106, or the like. In particular, processing circuitry 112 and/or sampling circuitry 114 can execute instructions 118 to cause processing circuitry 112 and/or sampling circuitry 114 to sample voltage levels on communication bus 106 to identify the next number of recessive bits on communication bus 106.

Continuing to block 1008 "overwrite the recessive bit(s) to corrupt the received messages" the number of identified recessive bits can be overwritten to corrupt any received messages. For example, attack prevention device 104 can overwrite the identified recessive bits to force the voltage level to be dominant during the time in which the recessive bit(s) are transmitted on communication bus 106, which will corrupt any received messages. In particular, processing circuitry 112 and/or sampling circuitry 114 can overwrite the voltage levels on communication bus 106 during the time in which the recessive bits are identified to corrupt messages received based on the recessive bits and the identified glitches.

Figure 11:
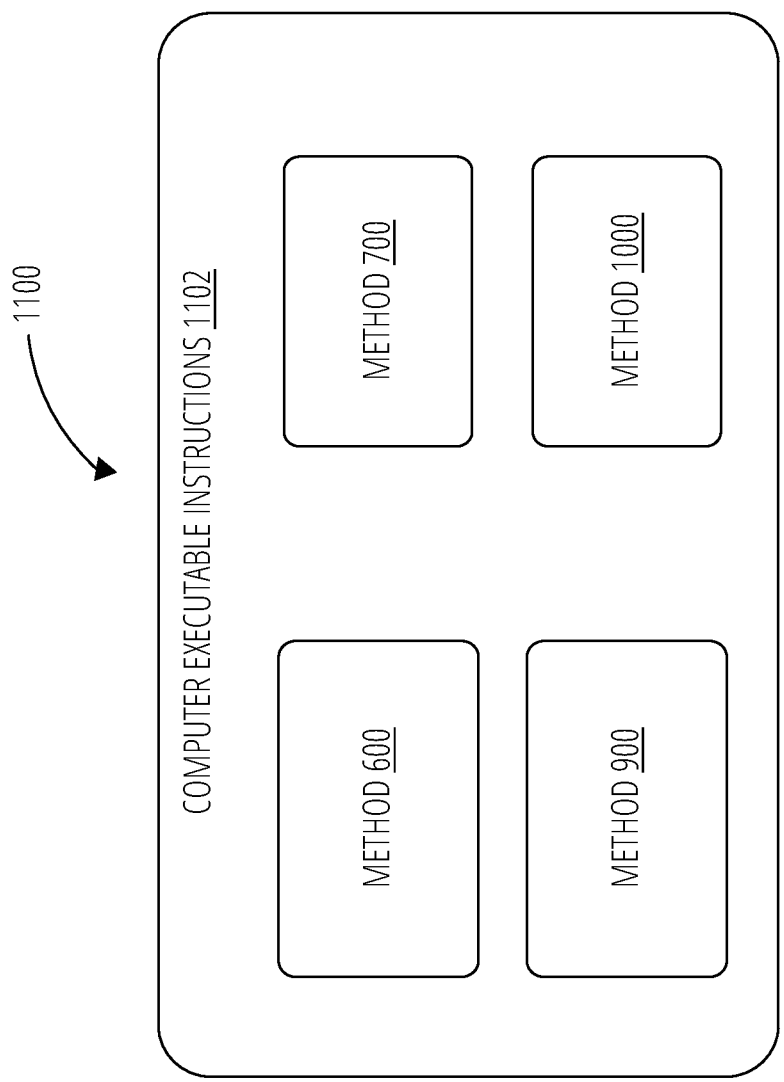
FIG. 11 illustrates a storage device in accordance with at least one embodiment.

FIG. 11 illustrates an example of a storage device 1100. Storage device 1100 may comprise an article of manufacture, such as, any non-transitory computer readable medium or machine readable medium, such as an optical, magnetic or semiconductor storage. Storage device 1100 may store various types of computer executable instructions 1102, such as instructions to implement method 600, method 700, method 900 and/or method 1000. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
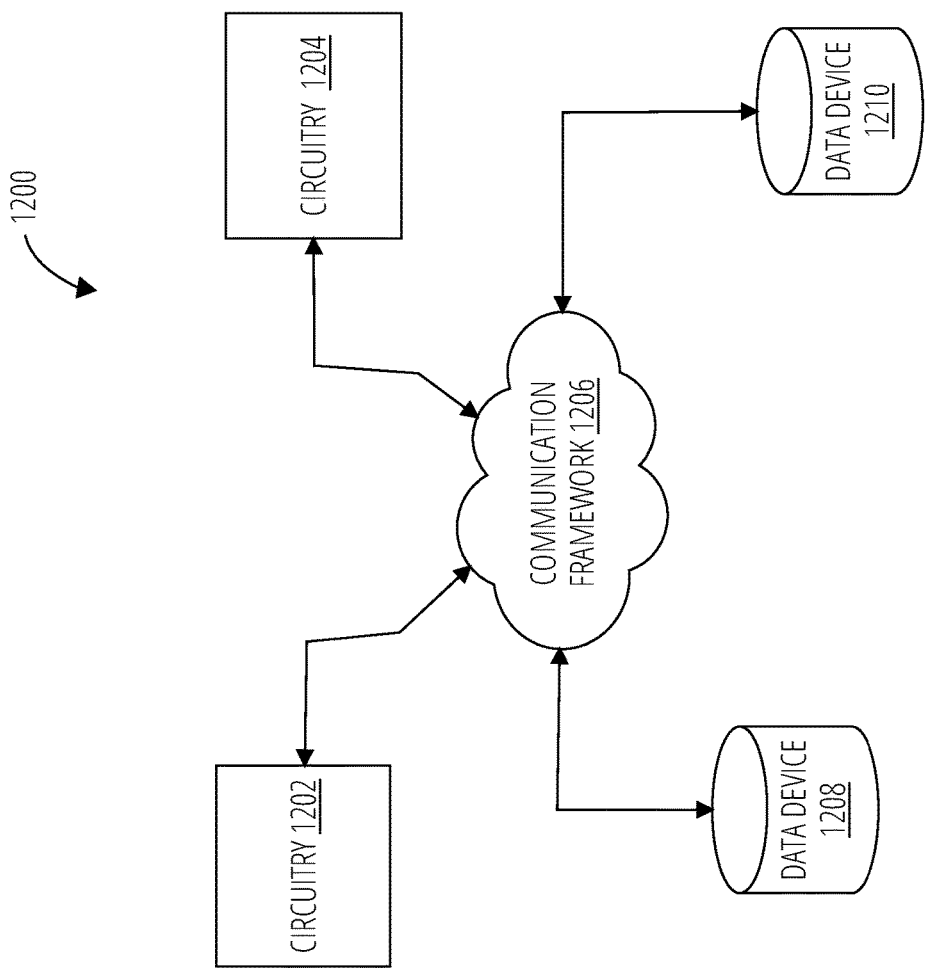
FIG. 12 illustrates an in-vehicle communication architecture in accordance with at least one embodiment.

FIG. 12 illustrates an in-vehicle communication architecture 1200 according to one or more embodiments of the disclosure. For example, one or more vehicular devices, components, or circuits, such as circuitry 1202 and/or circuitry 1204, may communicate with each other via a communications communication framework 1206, which may be an in-vehicle network, such as a CAN bus, implemented to facilitate glitch attack mitigation as described above.

The in-vehicle communication architecture 1200 includes various common communications elements, such as a transmitter, receiver, transceiver, and so forth. The embodiments, however, are not limited to implementation by the in-vehicle communication architecture 1200. As shown in this figure, the vehicular circuitry 1202 and circuitry 1204 may each be operatively connected to one or more respective data devices, such as, data device 1208 and/or data device 1210 that can be employed to store information local to the respective circuitry 1202 and/or circuitry 1204, such as fingerprints, distributions, densities, voltage signals, or the like. It may be understood that the circuitry 1202 and circuitry 1204 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 1206 in a vehicle.

Further, the communication framework 1206 may implement any well-known communications techniques and protocols. As described above, the communication framework 1206 may be implemented as a CAN bus protocol or any other suitable in-vehicle communication protocol. The communication framework 1206 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 1206 may employ both wired and wireless connections.

Figure 13:
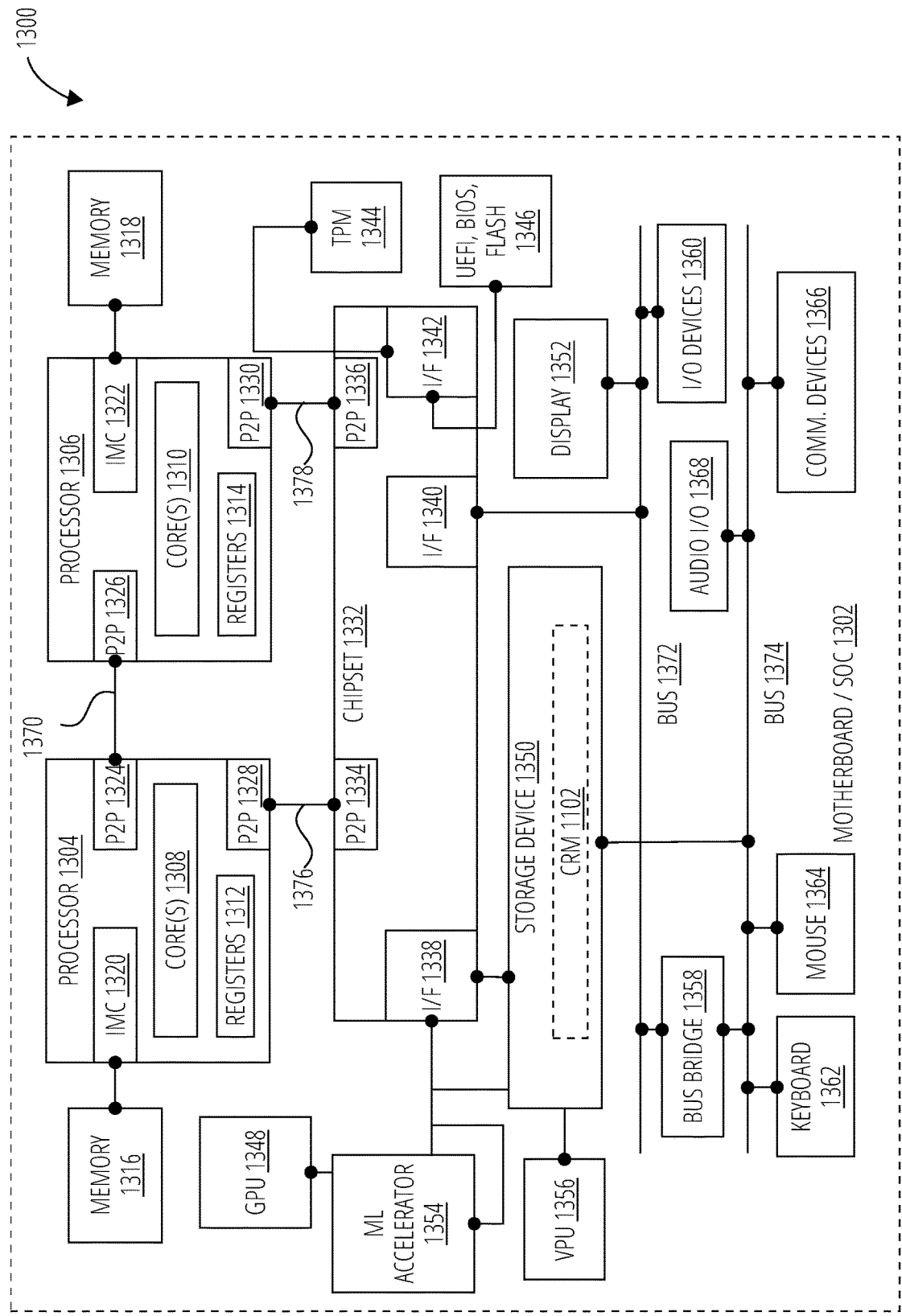
FIG. 13 illustrates a device in accordance with at least one embodiment.

FIG. 13 illustrates an embodiment of a system 1300. System 1300 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 1300 may have a single processor with one core or more than one processor. Note that the term "processor" refers to a processor with a single core or a processor package with multiple processor cores. In at least one embodiment, the computing system 1300 is representative of the components of system 100. More generally, the computing system 1300 is configured to implement all logic, systems, logic flows, methods, apparatuses, and functionality described herein with reference to FIG. 1 to FIG. 12.

As used in this application, the terms "system" and "component" and "module" are intended to refer to a computer-related entity, either hardware, a combination of hardware and software, software, or software in execution, examples of which are provided by the exemplary system 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 1300 comprises a motherboard or system-on-chip (SoC) 1302 for mounting platform components. Motherboard or system-on-chip (SoC) 1302 is a point-to-point (P2P) interconnect platform that includes a first processor 1304 and a second processor 1306 coupled via a point-to-point interconnect 1370 such as an Ultra Path Interconnect (UPI). In other embodiments, the system 1300 may be of another bus architecture, such as a multi-drop bus. Furthermore, each of processor 1304 and processor 1306 may be processor packages with multiple processor cores including core(s) 1308 and core(s) 1310, respectively. While the system 1300 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 1304 and chipset 1332. Some platforms may include additional components and some platforms may only include sockets to mount the processors and/or the chipset. Furthermore, some platforms may not have sockets (e.g., SoC, or the like).

The processor 1304 and processor 1306 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 1304 and/or processor 1306. Additionally, the processor 1304 need not be identical to processor 1306.

Processor 1304 includes an integrated memory controller (IMC) 1320 and point-to-point (P2P) interface 1324 and P2P interface 1328. Similarly, the processor 1306 includes an IMC 1322 as well as P2P interface 1326 and P2P interface 1330. IMC 1320 and IMC 1322 couple the processors processor 1304 and processor 1306, respectively, to respective memories (e.g., memory 1316 and memory 1318). Memory 1316 and memory 1318 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 1316 and memory 1318 locally attach to the respective processors (i.e., processor 1304 and processor 1306). In other embodiments, the main memory may couple with the processors via a bus and shared memory hub.

System 1300 includes chipset 1332 coupled to processor 1304 and processor 1306. Furthermore, chipset 1332 can be coupled to storage device 1350, for example, via an interface (I/F) 1338. The I/F 1338 may be, for example, a Peripheral Component Interconnect-enhanced (PCI-e). Storage device 1350 can store instructions executable by circuitry of system 1300 (e.g., processor 1304, processor 1306, GPU 1348, ML accelerator 1354, vision processing unit 1356, or the like).

For example, storage device 1350 can store instructions for method 600 and/or method 700, or the like.

Processor 1304 couples to a chipset 1332 via P2P interface 1328 and P2P 1334 while processor 1306 couples to a chipset 1332 via P2P interface 1330 and P2P 1336. Direct media interface (DMI) 1376 and DMI 1378 may couple the P2P interface 1328 and the P2P 1334 and the P2P interface 1330 and P2P 1336, respectively. DMI 1376 and DMI 1378 may be a high-speed interconnect that facilitates, e.g., eight Giga Transfers per second (GT/s) such as DMI 3.0. In other embodiments, the processor 1304 and processor 1306 may interconnect via a bus.

The chipset 1332 may comprise a controller hub such as a platform controller hub (PCH). The chipset 1332 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1332 may comprise more than one controller hub such as a chipset with a memory controller hub, a graphics controller hub, and an input/output (I/O) controller hub.

In the depicted example, chipset 1332 couples with a trusted platform module (TPM) 1344 and UEFI, BIOS, FLASH circuitry 1346 via I/F 1342. The TPM 1344 is a dedicated microcontroller designed to secure hardware by integrating cryptographic keys into devices. The UEFI, BIOS, FLASH circuitry 1346 may provide pre-boot code.

Furthermore, chipset 1332 includes the I/F 1338 to couple chipset 1332 with a high-performance graphics engine, such as, graphics processing circuitry or a graphics processing unit (GPU) 1348. In other embodiments, the system 1300 may include a flexible display interface (FDI) (not shown) between the processor 1304 and/or the processor 1306 and the chipset 1332. The FDI interconnects a graphics processor core in one or more of processor 1304 and/or processor 1306 with the chipset 1332. Additionally, ML accelerator 1354 and/or vision processing unit 1356 can be coupled to chipset 1332 via I/F 1338. ML accelerator 1354 can be circuitry arranged to execute ML related operations (e.g., training, inference, etc.) for ML models. Likewise, vision processing unit 1356 can be circuitry arranged to execute vision processing specific or related operations. In particular, ML accelerator 1354 and/or vision processing unit 1356 can be arranged to execute mathematical operations and/or operands useful for machine learning, neural network processing, artificial intelligence, vision processing, etc.

Various I/O devices 1360 and display 1352 couple to the bus 1372, along with a bus bridge 1358 which couples the bus 1372 to a second bus 1374 and an I/F 1340 that connects the bus 1372 with the chipset 1332. In one embodiment, the second bus 1374 may be a low pin count (LPC) bus. Various devices may couple to the second bus 1374 including, for example, a keyboard 1362, a mouse 1364 and communication devices 1366.

Furthermore, an audio I/O 1368 may couple to second bus 1374. Many of the I/O devices 1360 and communication devices 1366 may reside on the motherboard or system-on-chip (SoC) 1302 while the keyboard 1362 and the mouse 1364 may be add-on peripherals. In other embodiments, some or all the I/O devices 1360 and communication devices 1366 are add-on peripherals and do not reside on the motherboard or system-on-chip (SoC) 1302.

The components and features of the devices described above may be implemented using any combination of processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
sampling, by circuitry of an attack prevention electronic control unit (ECU), a voltage waveform on a communication bus, the communication bus coupled to a plurality of ECUs;
identifying a glitch in the voltage waveform; and
modifying the voltage level on the communication bus based on the glitch to force bit levels to remain constant through an entire bit width of the glitch.

2. The method of claim 1, modifying the voltage level on the communication bus based on the glitch comprising:

identifying a recessive voltage level on the communication bus; and
overdriving the voltage level on the communication bus to change the recessive voltage level to a dominant voltage level.

3. The method of claim 1, sampling the voltage waveform on the communication bus comprising:
iteratively sampling the voltage level on the communication bus over a period of time to generate a plurality of voltage level samples; and
generating the voltage waveform from the plurality of voltage level samples.

4. The method of claim 3, identifying a glitch in the voltage waveform comprising determining whether the voltage level during a portion of the period of time unexpectedly changes.

5. The method of claim 4, wherein the voltage level during the portion of the period of time unexpectedly changes from a dominant voltage level to a recessive voltage level and wherein modifying the voltage level on the communication bus based on the glitch comprising overdriving the voltage level on the communication bus to maintain the dominant voltage level.

6. The method of claim 4, wherein the voltage level during the portion of the period of time unexpectedly changes from a recessive voltage level to a dominant voltage level and wherein modifying the voltage level on the communication bus based on the glitch comprising:
identifying a recessive voltage level on the communication bus; and
overwriting the voltage level on the communication bus for at least one ECU of the plurality of ECUs to maintain the recessive voltage level.

7. The method of claim 1, wherein the communication bus is an in-vehicle network.

8. A system, comprising:
a communication bus;
circuitry; and
memory storing instructions that, when executed by the circuitry, cause the circuitry to:
sample a voltage waveform on the communication bus;
identify a glitch in the voltage waveform; and
modify the voltage level on the communication bus based on the glitch to force bit levels to remain constant through an entire bit width of the glitch.

9. The computing apparatus of claim 8, the instructions when executed by the circuitry cause the circuitry to:
identify a recessive voltage level on the communication bus; and
overdrive the voltage level on the communication bus to change the recessive voltage level to a dominant voltage level.

10. The computing apparatus of claim 8, the instructions when executed by the circuitry cause the circuitry to:
iteratively sample the voltage level on the communication bus over a period of time to generate a plurality of voltage level samples; and
generate the voltage waveform from the plurality of voltage level samples.

11. The computing apparatus of claim 10, the instructions when executed by the circuitry cause the circuitry to determine whether the voltage level during a portion of the period of time unexpectedly changes.

12. The computing apparatus of claim 11, wherein the voltage level during the portion of the period of time unexpectedly changes from a dominant voltage level to a recessive voltage level and wherein the instructions when executed by the circuitry cause the circuitry to overdrive the voltage level on the communication bus to maintain the dominant voltage level.

13. The computing apparatus of claim 11, wherein the voltage level during the portion of the period of time unexpectedly changes from a recessive voltage level to a dominant voltage level and wherein the instructions when executed by the circuitry cause the circuitry to:
   identify a recessive voltage level on the communication bus, the bus coupled to a plurality of electronic control units (ECUs); and
   overwrite the voltage level on the communication bus for at least one ECU of the plurality of ECUs to maintain the recessive voltage level.

14. The computing apparatus of claim 13, wherein the communication bus is an in-vehicle network.

15. The computing apparatus of claim 13, comprising the plurality of ECUs.

16. A non-transitory computer-readable storage medium, the computer-readable storage medium including instructions that when executed by a circuitry of an attack prevention device coupled to a communication bus, cause the circuitry to:
   sample a voltage waveform on a communication bus;
   identify a glitch in the voltage waveform; and
   modify the voltage level on the communication bus based on the glitch to force bit levels to remain constant through an entire bit width of the glitch.

17. The computer-readable storage medium of claim 16, the instructions when executed by the circuitry cause the circuitry to:
   identify a recessive voltage level on the communication bus; and
   overdrive the voltage level on the communication bus to change the recessive voltage level to a dominant voltage level.

18. The computer-readable storage medium of claim 16, the instructions when executed by the circuitry cause the circuitry to:
   iteratively sample the voltage level on the communication bus over a period of time to generate a plurality of voltage level samples; and
   generate the voltage waveform from the plurality of voltage level samples.

19. The computer-readable storage medium of claim 18, the instructions when executed by the circuitry cause the circuitry to determine whether the voltage level during a portion of the period of time unexpectedly changes.

20. The computer-readable storage medium of claim 19, wherein the voltage level during the portion of the period of time unexpectedly changes from a dominant voltage level to a recessive voltage level and wherein the instructions when executed by the circuitry cause the circuitry to overdrive the voltage level on the communication bus to maintain the dominant voltage level.

21. The computer-readable storage medium of claim 19, wherein the voltage level during the portion of the period of time unexpectedly changes from a recessive voltage level to a dominant voltage level and wherein the instructions when executed by the circuitry cause the circuitry to:
   identify a recessive voltage level on the communication bus; and
   overwrite the voltage level on the communication bus for at least one ECU of the plurality of ECUs to maintain the recessive voltage level.

22. The computer-readable storage medium of claim 16, wherein the communication bus is an in-vehicle network.

* * * * *